(12) United States Patent
Freed et al.

(10) Patent No.: US 10,781,570 B2
(45) Date of Patent: Sep. 22, 2020

(54) RETROFIT CYLINDER ASSEMBLY FOR AGRICULTURAL EQUIPMENT

(71) Applicants: Bruce W. Freed, Lexington, IL (US); Brian E. Freed, Lexington, IL (US)

(72) Inventors: Bruce W. Freed, Lexington, IL (US); Brian E. Freed, Lexington, IL (US)

(73) Assignee: AG FOCUS LLC, Lexington, IL (US)

( * ) Notice: Subject to any disclaimer, the term of this patent is extended or adjusted under 35 U.S.C. 154(b) by 269 days.

(21) Appl. No.: 15/920,275

(22) Filed: Mar. 13, 2018

(65) Prior Publication Data

US 2018/0266078 A1   Sep. 20, 2018

Related U.S. Application Data

(60) Provisional application No. 62/500,365, filed on May 2, 2017, provisional application No. 62/470,440, filed on Mar. 13, 2017.

(51) Int. Cl.
*E02F 9/20* (2006.01)
*E02F 9/22* (2006.01)
*A01C 7/20* (2006.01)
*A01C 5/06* (2006.01)

(52) U.S. Cl.
CPC ............. *E02F 9/205* (2013.01); *A01C 5/066* (2013.01); *A01C 7/205* (2013.01); *E02F 9/2271* (2013.01); *E02F 9/2275* (2013.01); *A01C 5/068* (2013.01)

(58) Field of Classification Search
CPC ....... E02F 9/205; E02F 9/2271; E02F 9/2275; A01C 5/066; A01C 5/068; A01C 7/205
See application file for complete search history.

(56) References Cited

U.S. PATENT DOCUMENTS

| | | | | |
|---|---|---|---|---|
| 3,428,135 A | * | 2/1969 | Richey | A01B 3/464 172/212 |
| 3,503,454 A | * | 3/1970 | Oerman | A01B 61/046 172/260.5 |
| 3,579,873 A | * | 5/1971 | Kershaw | E01B 27/023 37/105 |
| 3,583,284 A | * | 6/1971 | Ryan | A01B 39/19 91/189 R |
| 4,111,268 A | * | 9/1978 | Frisbee | E02F 3/7613 172/813 |
| 4,207,951 A | * | 6/1980 | Wilcox | A01B 3/464 172/225 |
| 4,351,397 A | * | 9/1982 | Winker | E02F 5/326 172/464 |

(Continued)

*Primary Examiner* — Jamie L McGowan
(74) *Attorney, Agent, or Firm* — William H. Honaker; Dickinson Wright PLLC

(57) ABSTRACT

A retrofit assembly used to substitute a remotely controlled cylinder for a furrow closing standard spring on agricultural equipment. The retrofit assembly includes a cylinder mount including a cylinder mount tab and a cylinder mount fixture. The cylinder mount is connected to the furrow mount. The cylinder bracket 30 is mounted to the agricultural equipment. A remotely controlled fluid cylinder is mounted between the cylinder mounting assembly and the cylinder mounting bracket. A standard spring for a furrow closing assembly on agricultural equipment can be replaced with a remotely control fluid cylinder allowing the furrow closing assembly to be controlled remotely by the user.

7 Claims, 9 Drawing Sheets

(56) References Cited

U.S. PATENT DOCUMENTS

| | | | | |
|---|---|---|---|---|
| 4,700,785 A * | 10/1987 | Bartusek | A01B 61/046 | 111/84 |
| 5,653,292 A * | 8/1997 | Ptacek | A01B 63/114 | 172/239 |
| 5,868,207 A * | 2/1999 | Langbakk | A01C 7/201 | 172/274 |
| 6,293,354 B1 * | 9/2001 | Garratt | A01B 49/02 | 172/662 |
| 8,418,777 B1 * | 4/2013 | Grossen | E02F 3/7668 | 172/799.5 |
| 2006/0000622 A1 * | 1/2006 | Cresswell | A01B 63/26 | 172/705 |
| 2009/0236105 A1 * | 9/2009 | Olson | A01B 61/046 | 172/1 |
| 2010/0006308 A1 * | 1/2010 | Schmidt | A01B 69/004 | 172/1 |
| 2011/0011604 A1 * | 1/2011 | Takami | E02F 3/7627 | 172/813 |
| 2011/0100657 A1 * | 5/2011 | Connors | A01B 73/00 | 172/439 |
| 2012/0111584 A1 * | 5/2012 | Palen | A01B 63/22 | 172/1 |
| 2012/0138321 A1 * | 6/2012 | Harris | A01B 59/064 | 172/810 |
| 2013/0062083 A1 * | 3/2013 | Casper | A01B 21/083 | 172/452 |
| 2013/0146318 A1 * | 6/2013 | Bassett | A01B 61/044 | 172/5 |
| 2014/0116735 A1 * | 5/2014 | Bassett | A01C 7/205 | 172/2 |
| 2014/0166321 A1 * | 6/2014 | Hurd | A01B 37/00 | 172/239 |
| 2014/0251646 A1 * | 9/2014 | Gray | A01B 29/048 | 172/1 |
| 2016/0165789 A1 * | 6/2016 | Gervais | A01C 7/105 | 700/275 |
| 2017/0218585 A1 * | 8/2017 | Vigneault | E01H 5/062 | |
| 2019/0297774 A1 * | 10/2019 | Hamilton | A01B 63/32 | |

* cited by examiner

RETROFIT CYLINDER ASSEMBLY FOR AGRICULTURAL EQUIPMENT

RELATED APPLICATIONS

This application claims the benefit of U.S. Provisional Application Nos. 62/470,440 filed on Mar. 13, 2017, and 62/500,365, filed on May 2, 2017, which are incorporated herein by reference in their entirety.

STATEMENT REGARDING FEDERALLY SPONSORED RESEARCH

NONE.

TECHNICAL FIELD

This invention relates generally to agricultural equipment and more specifically to an assembly that allows replacement of a standard spring, such as a coil spring or airbag, with a fluid cylinder for remote operation of an implement such as a furrow closing assembly. More specifically, the present invention relates to a bracket assembly that allows remote operation of closing wheels.

BACKGROUND OF THE INVENTION

Agricultural planters form a furrow in the ground, deposit seed in the furrow, and then cover the seed with soil. The mechanism for covering the seed with soil is generally referred to as a furrow closing assembly.

A variety of furrow closing assemblies are known in the prior art. For example, furrow closing assemblies are commercially available that are designed to be pivotally attached to pivot pins located at the rear end of planter row units. Such furrow closing assemblies include, for example: (1) a pair of press wheels that roll on each side of the furrow and pinch the furrow closed, (2) a drag system that pulls loose soil into the furrow, and (3) a pair of closing discs that direct soil back into the furrow.

A furrow closing system comprising V-shaped closing discs is sold by John Deere. However, the down-force systems on these furrow closing systems are not adjustable remotely to adapt the furrow closing system to different soil conditions.

In another example, a furrow closing system comprising a pair of closing discs followed by a press wheel is sold by Case-IH for its Model 1200 planters. However, the down-force systems on these furrow closing systems are not adjustable remotely to adapt the furrow closing system to different soil conditions.

There is a need in the industry for an improved furrow closing system for agricultural planters. In particular, there is a need for a remotely controlled furrow closing system.

DETAILED DESCRIPTION OF A PREFERRED EMBODIMENT

Figure 1:
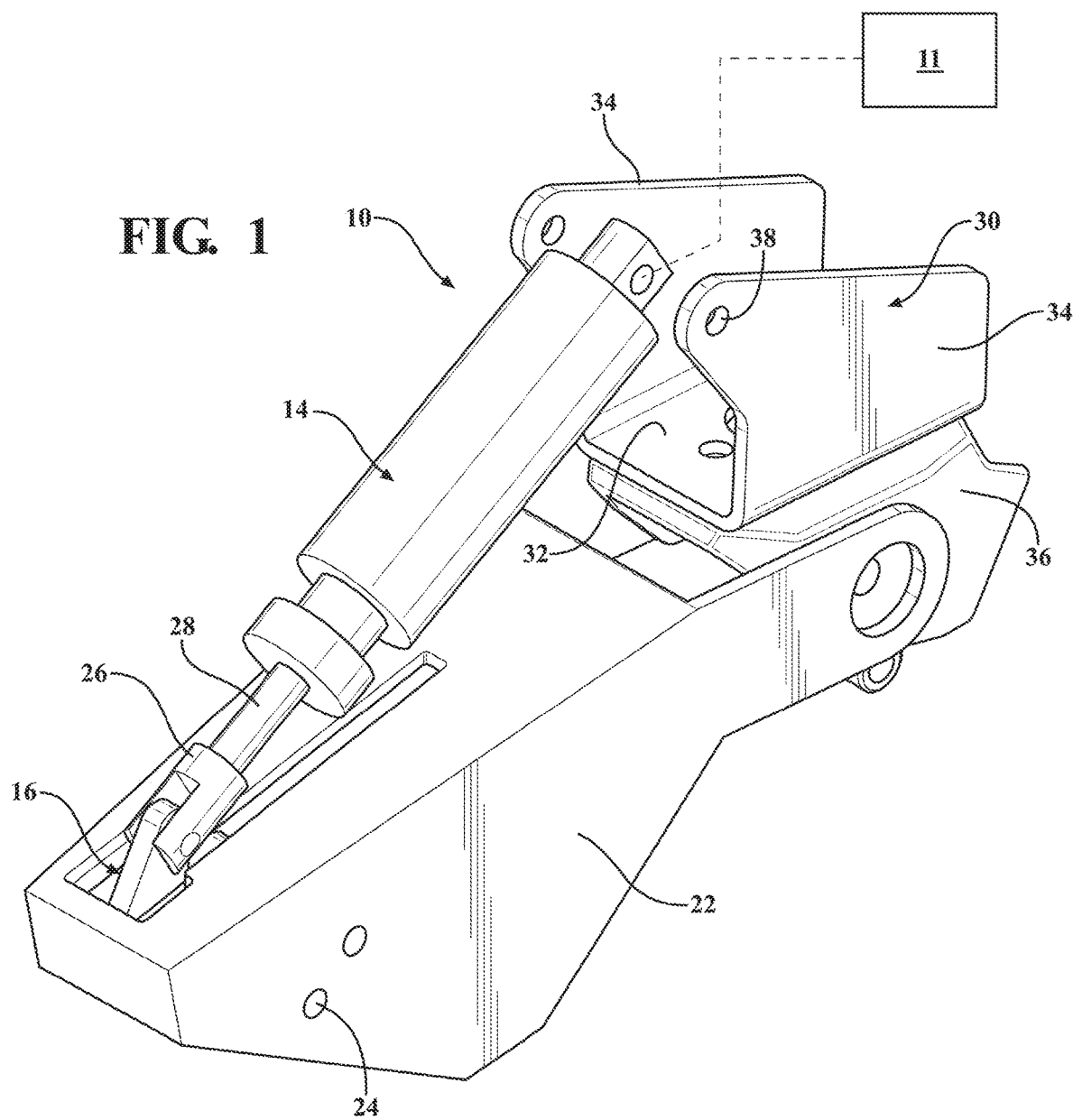
FIG. 1 is a perspective view of the retrofit cylinder assembly of the present invention.

The retrofit cylinder mounting assembly of the present invention is shown generally at 10 in FIG. 1. The assembly 10 is intended to fit existing furrow closing systems such as for example a furrow closing system having a pair of V-closing discs sold by for example John Deere, see 12 in FIG. 2.

Figure 2:
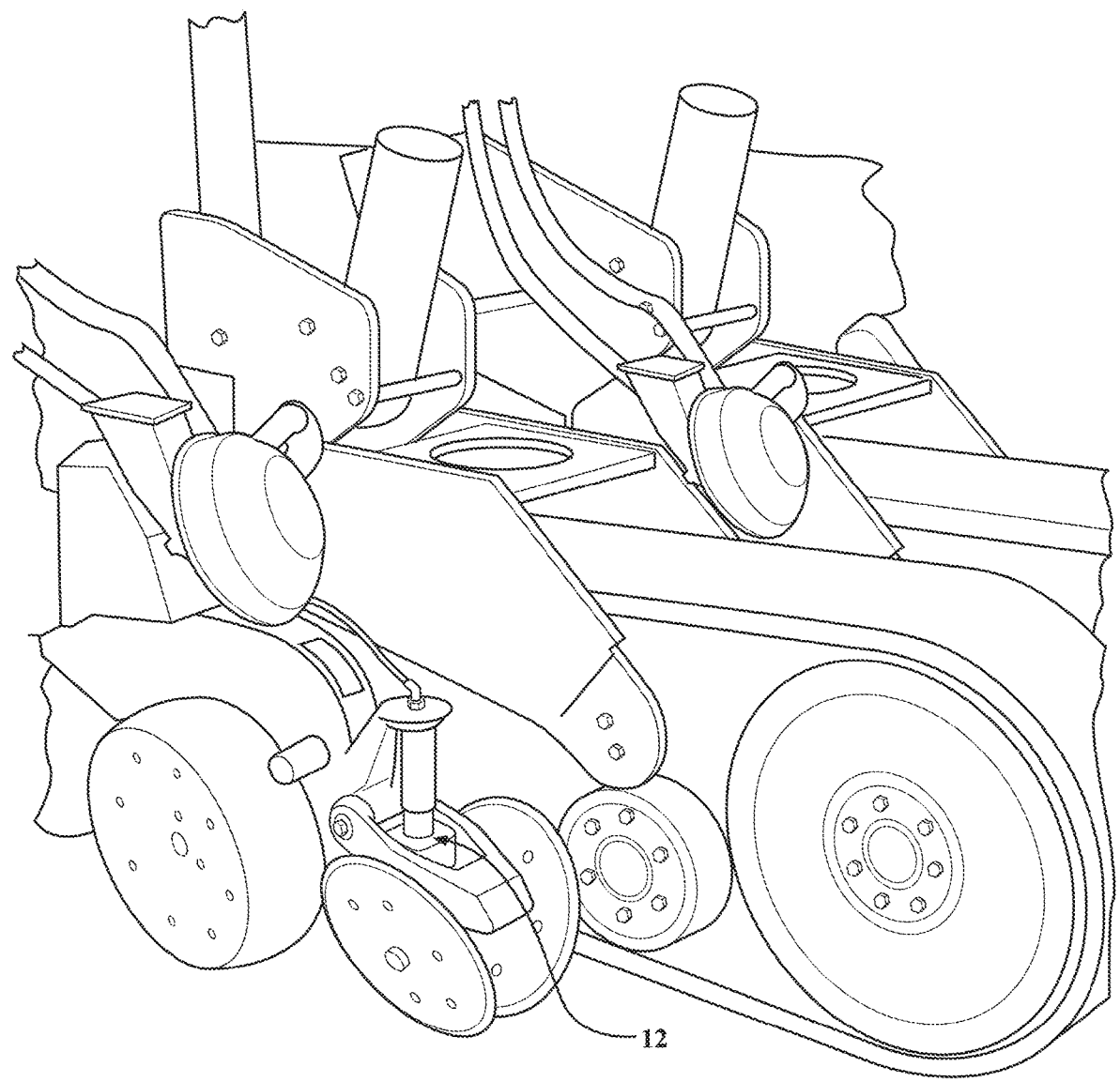
FIG. 2 is a perspective view of a typical furrow closing unit upon which the retrofit cylinder assembly of the present invention would be substituted.
Figure 3:
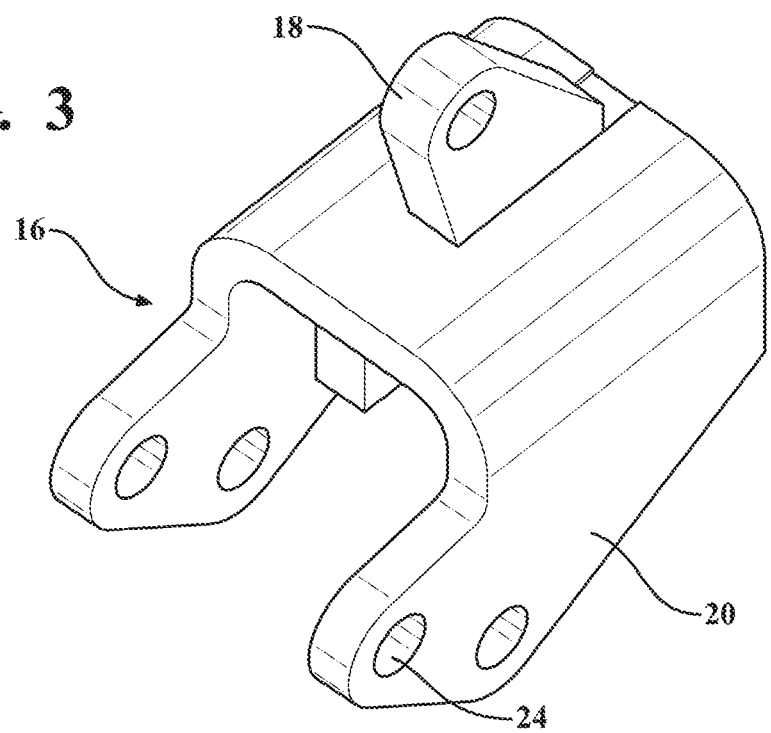
FIG. 3 is a perspective view of the cylinder mount assembly of the present invention.
Figure 4:
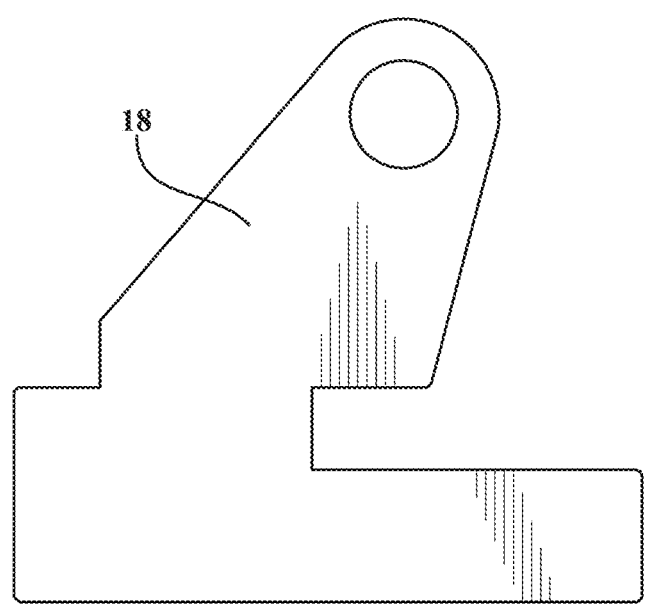
FIG. 4 is a side view of the mount tab of the present invention.
Figure 5:
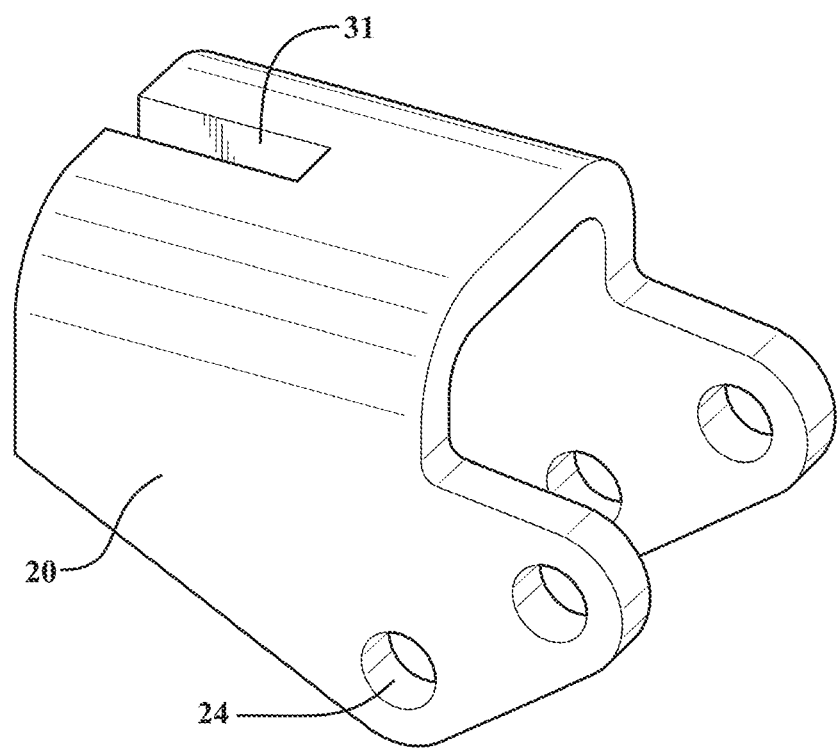
FIG. 5 is a perspective view of the cylinder mount fixture of the present invention.
Figure 6:
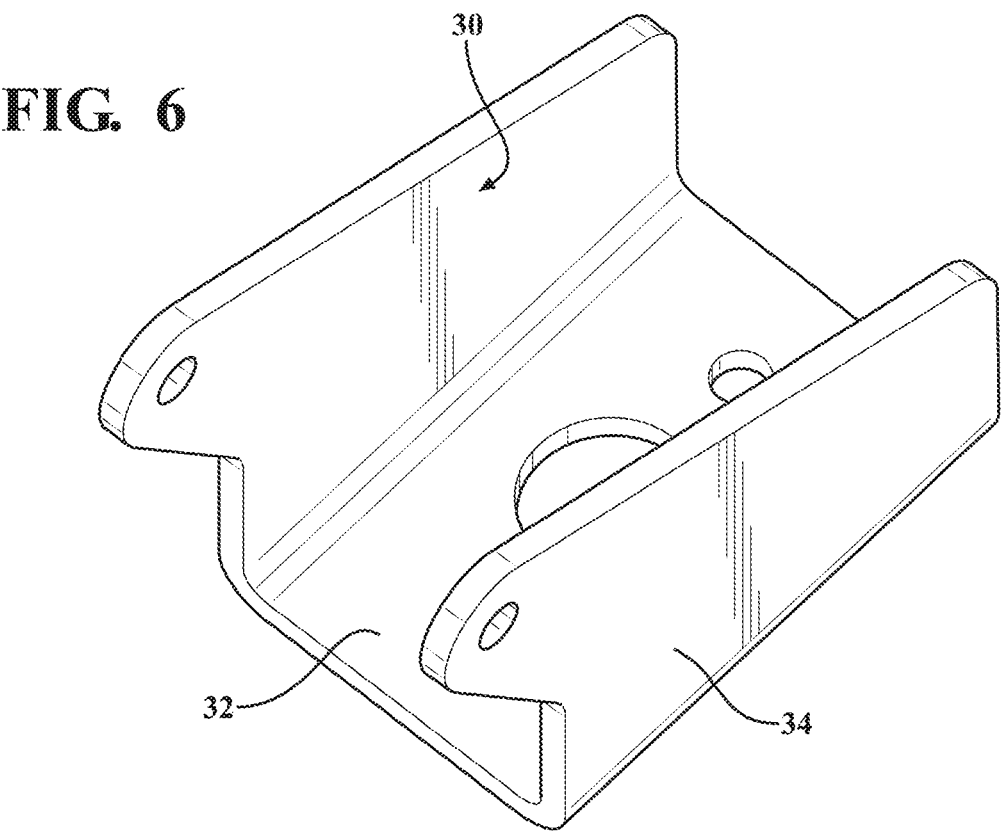
FIG. 6 is a perspective view of the cylinder mounting bracket of the present invention.

The assembly 10 of the present invention permits a standard spring biased or air cylinder biased v-closing disc as shown in FIG. 2 to be remotely controlled through a substituted fluid cylinder 14, such as for example an air or hydraulic cylinder. The assembly 10 replaces the bracket 12 shown in FIG. 2 to allow a fluid cylinder 14, as illustrated in FIG. 1, to replace the spring of FIG. 2. The fluid cylinder 14 is a standard commercially available fluid cylinder that fits within the retrofit assembly 10 of the present invention.

In the disclosed embodiment, the standard cylinder 14 has a 2 inch bore and a 2 inch stroke. The cylinder is about 8 to 12 inches in length. As will be appreciated by those of ordinary skill in the art, a standard cylinder cannot be used in the existing system shown in FIG. 2. The Bracket assembly 10 is specifically designed to allow standard fluid cylinders 14 to be used to reduce the cost of the system. In this way, a cost-effective solution for providing remote controlled operation of the v-closing wheel assembly is inexpensively and easily provided to replace the standard coil spring or air bag unit as illustrated in FIG. 2.

It will be understood by those of ordinary skill in the art that a controller and connectors 11 to remotely control the cylinder 14 are required. A kit 11 having the controller and connectors would be supplied with the assembly 10 for connection to the cylinder for retrofitting the standard controlled v-shaped furrow closer.

The retrofit assembly 10 of the present invention includes a cylinder mount assembly 16. The cylinder mount assembly 16 includes a cylinder mount tab 18 and a cylinder mount fixture 20. The cylinder mount fixture 20 is mounted to the furrow mount 22 by for example machine bolts received through bolt holes 24. The mount tab 18 receives the connector 26 on the shaft 28 of the cylinder 14. A pin, not shown connects the connector to the tab 18. The cylinder mount tab 18 is received within a slot 31 in the cylinder mount fixture 20.

The opposite end of the cylinder 14 is mounted to cylinder mounting bracket 30. Cylinder mounting bracket 30 has a base 32 and opposed sides 34. The base has bolt holes for mounting the cylinder mounting bracket 30 to the mount 36. Opposed sides 34 have apertures 38 for receipt of a mounting pin to mount the cylinder 14 to the bracket 30.

Figure 7:
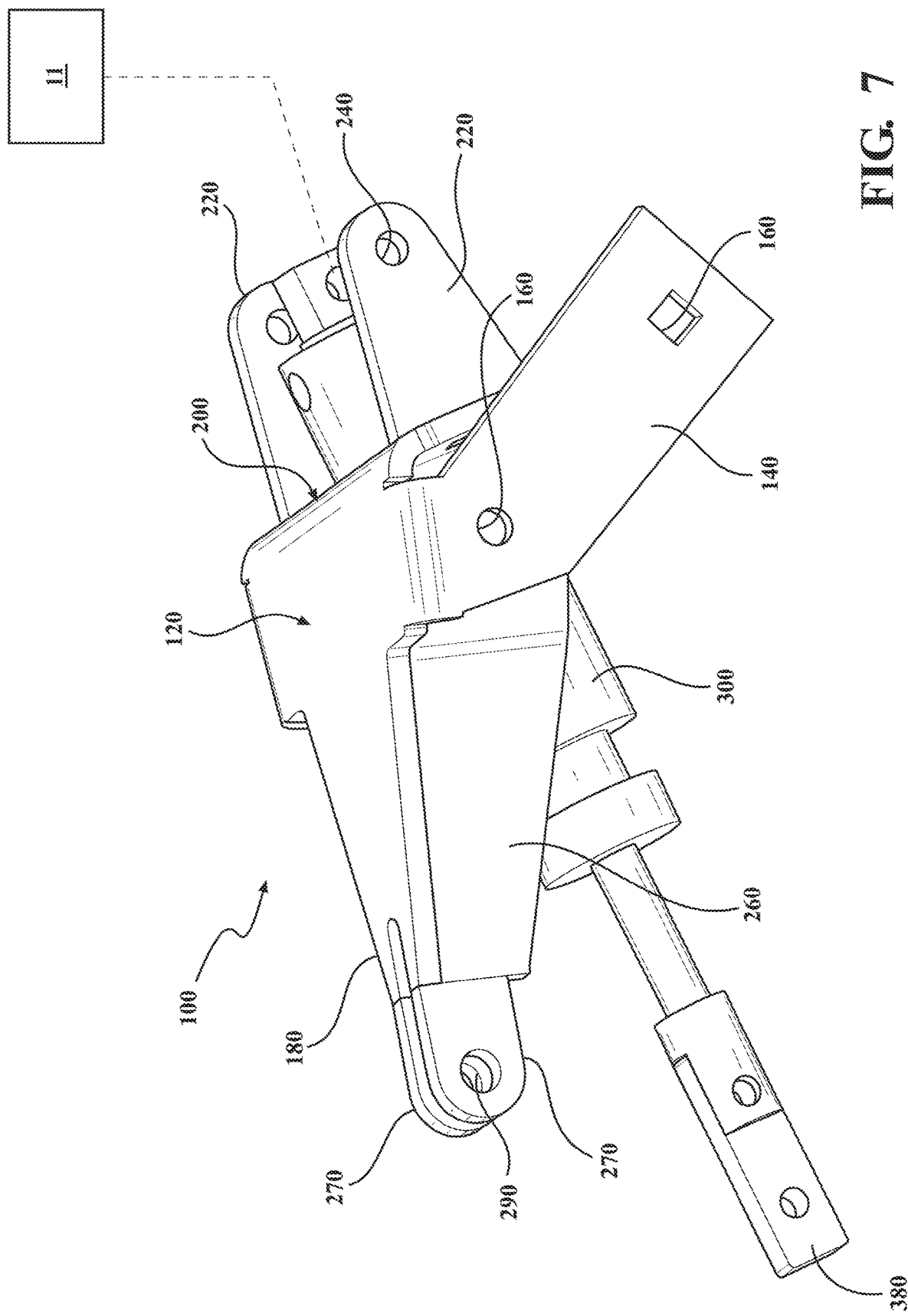
FIG. 7 is a perspective view of a further embodiment of the retrofit cylinder assembly of the present invention.

A further embodiment of the retrofit cylinder mounting assembly of the present invention is shown generally at 100 in FIG. 7. The assembly 100 is intended to fit existing furrow closing systems such as for example a furrow closing system having a pair of closing discs followed by a press wheel sold by Case-IH for its Model 1200 planters. The Case-IH model 1200 planter is shown in FIG. 2.

Figure 8:
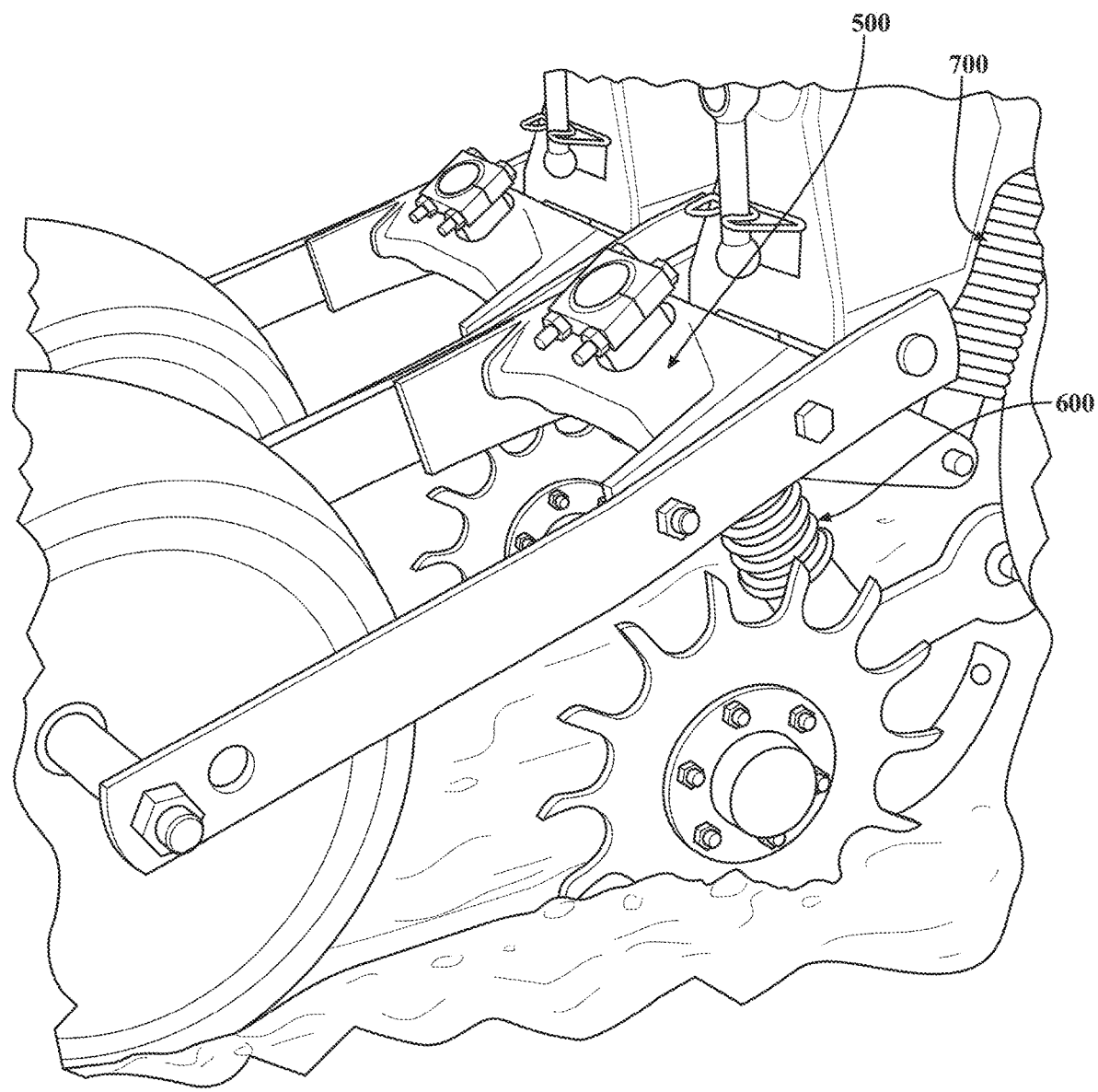
FIG. 8 is a perspective view of a typical furrow closing unit upon which the retrofit cylinder assembly of the present invention would be substituted.
Figure 9:
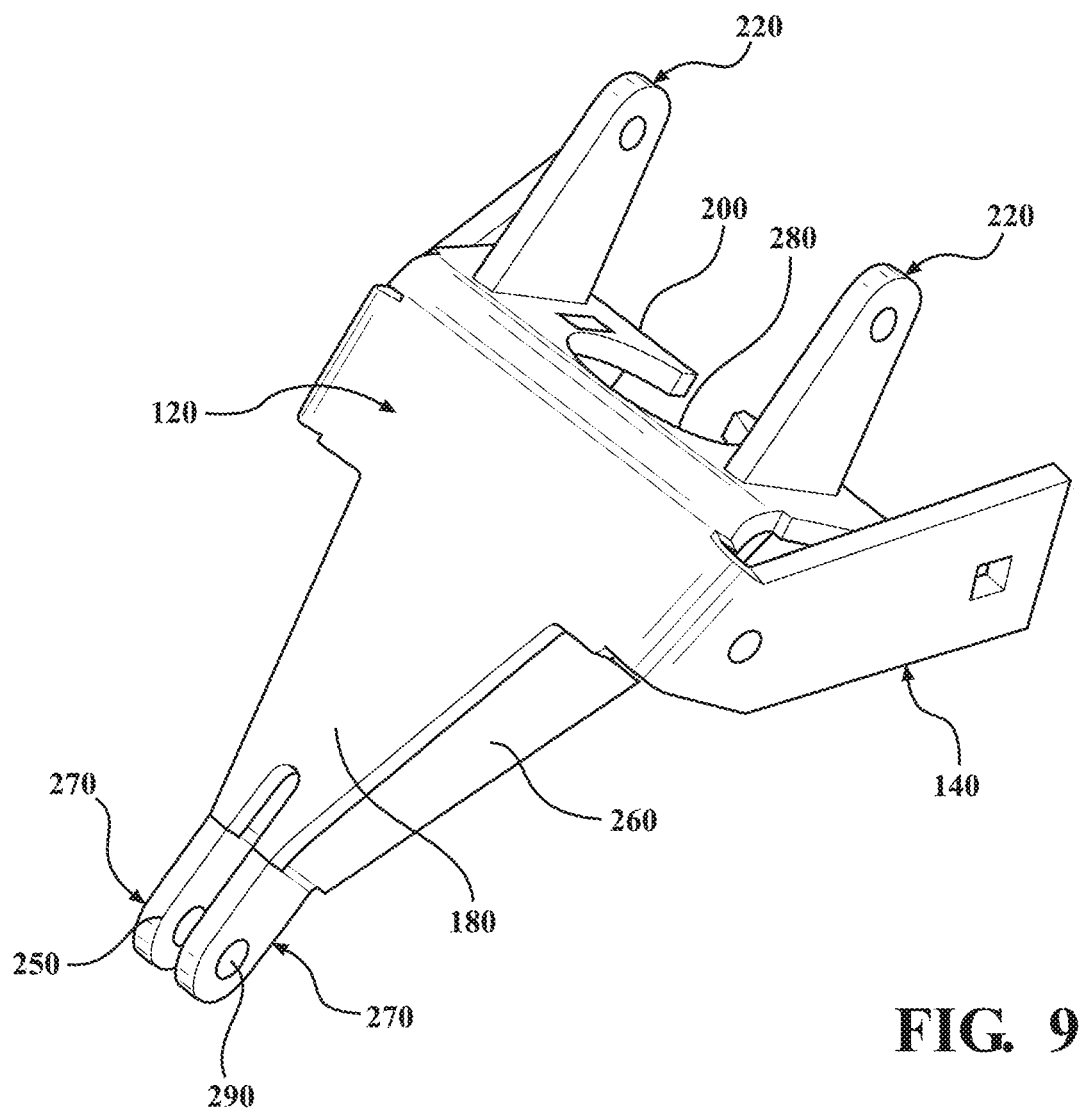
FIG. 9 is a perspective view of a further embodiment the retrofit cylinder assembly of the present invention.
Figure 10:
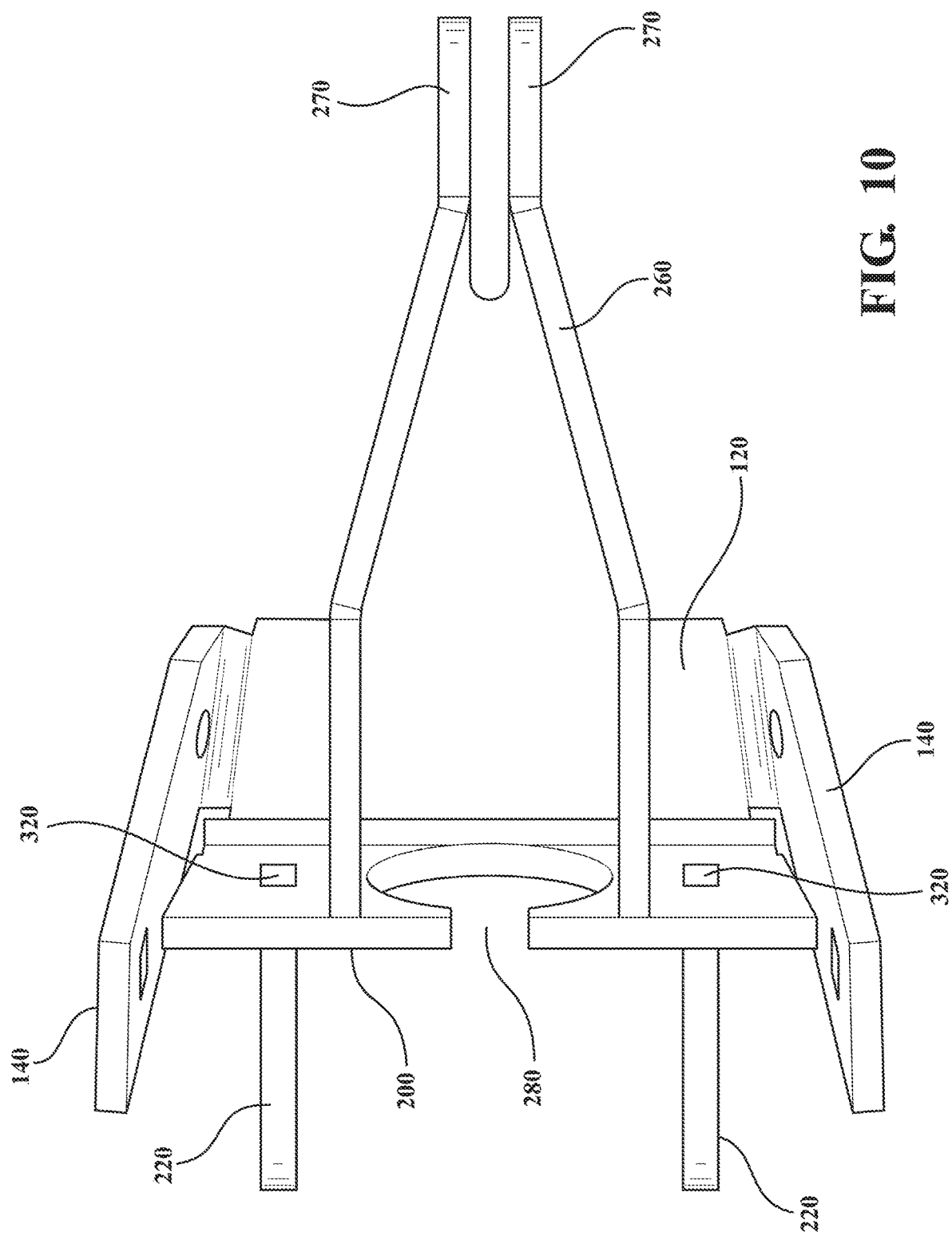
FIG. 10 is a bottom view of a further embodiment the retrofit cylinder assembly of the present invention.

The assembly 100 of the present invention permits a standard spring biased closing disc as shown in FIG. 8 to be remotely controlled through a substituted fluid cylinder, such as for example an air or hydraulic cylinder. The assembly 100 replaces the bracket 500 shown in FIG. 8 to allow a fluid cylinder 300, as illustrated in FIG. 7, to replace the spring 600 of FIG. 8. The fluid cylinder 300 is a standard commercially available fluid cylinder that fits within the retrofit assembly 100 of the present invention.

In the disclosed embodiment, the standard cylinder 300 has a 2 inch bore and a 2 inch stroke. The cylinder is about 8 to 12 inches in length. As will be appreciated by those of ordinary skill in the art, a standard cylinder cannot be used in the existing spring system shown in FIG. 8. The assembly 100 is specifically designed to allow standard fluid cylinders 300 to be used to reduce the cost of the system. In this way, a cost-effective solution for providing remote controlled operation of the closing wheel assembly is inexpensively and easily provided to replace the standard coil spring unit 600 as illustrated in FIG. 8.

It will be understood by those of ordinary skill in the art that a controller and connectors to remotely control the cylinder 300 are required. A kit 11 having the controller and connectors would be supplied with the assembly 100 for connection to the cylinder for retrofitting the standard spring controlled furrow closer.

The retrofit assembly 100 of the present invention includes a top plate 120. The top plate 120 acts as a stop to control the upward movement of the furrow closer. Top plate 120 has mounting arms 140 extending generally perpendicular to the top plate 120. The mounting arms 140 have mounting openings 160 which receive the bolts shown in FIG. 8 that are used to mount the standard bracket 500.

The top plate 120 also includes a nose portion 180 and an end plate 200. The end plate includes cylinder mounting ears 220 which have openings 240 for receipt of a bolt to secure the cylinder 300 to the assembly 100. The end plate 200 also includes a cylinder aperture 280 which receives the outer barrel of the cylinder 300 so that it extends through the assembly 100 for receipt of mounting bolts (not shown). The cylinder aperture 280 allows standard commercially available cylinders 300 to be used in retrofitting the standard furrow closing unit of FIG. 8 to a remote-controlled pneumatic fluid controlled cylinder 300.

Sidewalls 260 provide added strength to the assembly 100 as well as providing left and right supports 270. The supports 270 connect to the spring assembly 700 shown in FIG. 8. The left and right supports 270 have a channel 250 for receipt of a mating bracket on spring assembly 700 and bolt holes 290 for receipt of connecting bolts. The cylinder 300 has a connector 380 for connection to the closing wheel assembly.

Figure 11:
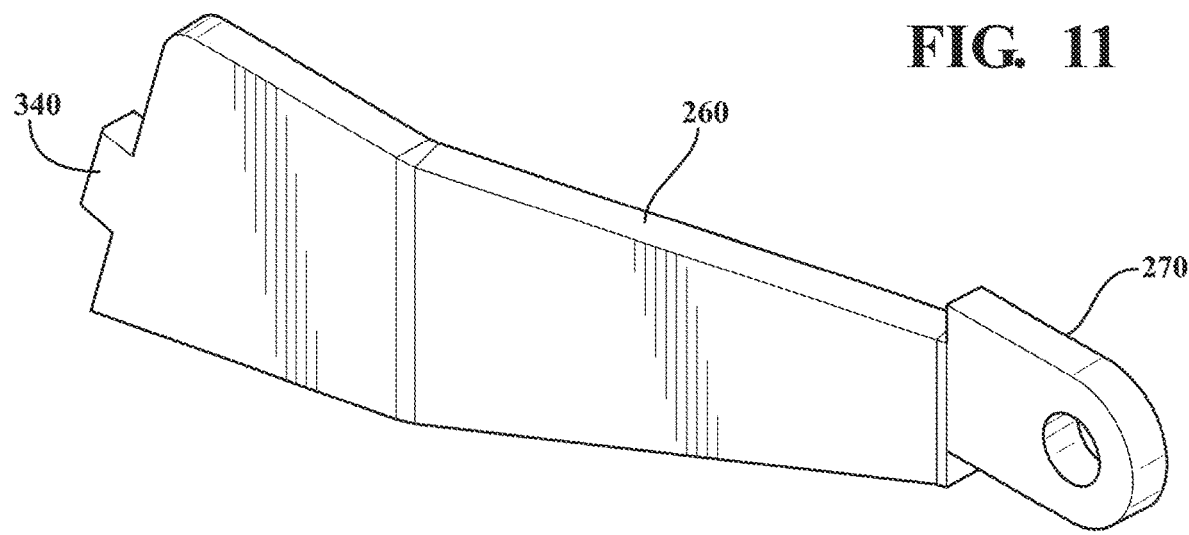
FIG. 11 is a side perspective view of the side wall of the further embodiment of the retrofit cylinder assembly of the present invention.
Figure 12:
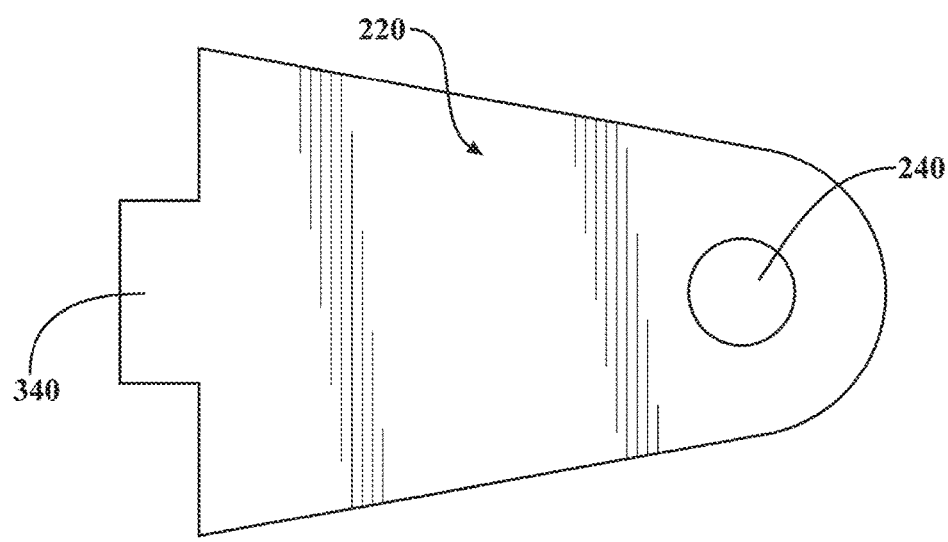
FIG. 12 is a side view of the cylinder mounting ears of the present invention.

With reference to FIGS. 11 and 12, tabs 340 are shown on the cylinder mounting ears 220 and the sidewalls 260. These tabs 340 are received within slots 320 formed in the end plate 200. The cylinder mounting arms 220 and sidewalls 260 can then be welded to the top plate 120 providing added strength to the assembly 100.

The present invention provides a unique, inexpensive retrofit to allow an existing furrow closing system to be remotely controlled with the use of the mounting assembly of the present invention. Those of ordinary skill in the art will appreciate; soil conditions require different downward pressures on the soil to ensure optimal growing conditions. A spring biasing system does not allow remote control of the pressure applied to the furrow closing system or control on the fly, i.e. while the unit is moving across a field and experiencing changing systems. To allow a farmer to use existing equipment and to get the advantage of the remote operation of the equipment, the present retrofit assembly has been invented to provide a retrofit to replace the existing spring biasing system with a remote controlled dynamically adjustable fluid spring.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A retrofit assembly for substituting a remotely controlled cylinder for a furrow closing standard spring on agricultural equipment, said retrofit assembly comprising:
    a top plate 120, having mounting arms 140 for connecting said top plate to agricultural equipment;
    said top plate 120 includes a nose portion 180 and an end plate 200;
    said end plate 200 includes an opening 280 which receives the outer barrel of a cylinder 300;
    said top plate 120 acts as a stop to control the upward movement of the furrow closer;
    wherein a standard spring for a furrow closing assembly on agricultural equipment can be replaced with a remotely control fluid cylinder allowing the furrow closing assembly to be controlled remotely by the user.

2. The retrofit assembly of claim 1, wherein said opening 280 is an aperture that allows standard commercially available cylinders 300 to be used in retrofitting the standard furrow closing unit to a remote-controlled pneumatic fluid controlled cylinder 300.

3. The retrofit assembly of claim 1, wherein said mounting arms 140 extend away from said top plate 120.

4. The retrofit assembly of claim 1, wherein said end plate includes cylinder mounting ears 220 which have openings 240 for receipt of a bolt to secure the cylinder.

5. The retrofit assembly of claim 1, wherein said top plate includes sidewalls 260 to provide added strength to said retrofit assembly.

6. The retrofit assembly of claim 1, wherein said nose portion 180 includes supports 270 to connect the retrofit assembly to said agricultural equipment.

7. The retrofit assembly of claim 6, wherein said support 270 has a channel 250 for receipt of a spring assembly 700.

* * * * *